(12) United States Patent
Sherman

(10) Patent No.: US 7,161,951 B1
(45) Date of Patent: Jan. 9, 2007

(54) MECHANISM FOR IMPLEMENTING VIRTUAL CARRIER SENSE

(75) Inventor: Matthew J. Sherman, Succasunna, NJ (US)

(73) Assignee: AT&T Corp., New York, NY (US)

( * ) Notice: Subject to any disclaimer, the term of this patent is extended or adjusted under 35 U.S.C. 154(b) by 1051 days.

(21) Appl. No.: 10/123,203

(22) Filed: Apr. 17, 2002

Related U.S. Application Data

(60) Provisional application No. 60/297,570, filed on Jun. 12, 2001.

(51) Int. Cl.
  *H04L 12/413* (2006.01)
(52) U.S. Cl. .................... 370/447; 370/461
(58) Field of Classification Search ............. 370/445, 370/447, 461
  See application file for complete search history.

(56) References Cited

U.S. PATENT DOCUMENTS 6,215,389 B1 * 4/2001 Schmidt .................... 340/5.1
6,442,608 B1 * 8/2002 Knight et al. ............... 709/225
6,792,392 B1 * 9/2004 Knight ....................... 702/186
6,832,086 B1 * 12/2004 Powers et al. .............. 455/423

* cited by examiner

*Primary Examiner*—Ricky Q. Ngo
*Assistant Examiner*—Richard Chang
(74) *Attorney, Agent, or Firm*—Banner & Witcoff, Ltd.

(57) ABSTRACT

A method and a system for controlling access to a communication medium of at least one network uses a plurality of event counters that are maintained in a station coupled to at least one network through the communication medium. Each event counter has a corresponding context and a corresponding state. Each context defines a response for the corresponding event counter to at least one predetermined event. Each state represents a combined effect for the corresponding counter in response to at least one occurrence of a predetermined event defined by the corresponding context. Determination whether to access the communication medium is based on the state of at least two event counters.

23 Claims, 1 Drawing Sheet

MECHANISM FOR IMPLEMENTING VIRTUAL CARRIER SENSE

BACKGROUND OF THE INVENTION

This application claims priority to provisional U.S. Application Ser. No. 60/297,570, entitled Mechanism For Implementing Virtual Carrier Sense, invented by Matthew J. Sherman, filed Jun. 12, 2001, and incorporated by reference herein.

FIELD OF THE INVENTION

The invention relates to telecommunications. More particularly, the present invention relates to a method and system for providing Quality of Service (QoS) enhancements and for controlling access to a wireless Local Area Network (WLAN) within an IEEE 802.11 service-type environment.

DESCRIPTION OF THE RELATED ART

The IEEE 802.11 standard (Standard 802.11-1999 being the current issue at the time this application was filed, and which is incorporated by reference herein) is a well-established standard for implementing a Media Access Controller (MAC) and Physical Layer controller/interface (PHY) in wireless LANs (WLANs). The 802.11 protocol is based on the well-known technique called Carrier Sense Multiple Access/Collision Avoidance (CSMA/CA). In this protocol, all stations (STAs) must sense the Wireless Medium (WM) of the WLAN before transmitting. A station (STA) is defined as any device that contains an IEEE 802.11 conformant medium access control (MAC) and physical layer (PHY) interface to the wireless medium. When a STA determines that another STA is already transmitting, the STA defers transmission until the WM is determined to be is clear. The 802.11 standard adds a number of variations to the basic CSMA/CA mechanism. For example, the Physical Carrier Sense (called Clear Channel Assessment or CCA) is a mechanism that informs the 802.11 MAC whether the channel is available for access. The 802.11 MAC also includes another form of carrier sense called the Virtual Carrier Sense.

The Virtual Carrier Sense is primarily implemented through a complex mechanism called the Network Allocation Vector (NAV). The NAV can be described conceptually as a counter implemented at each STA that counts down until the time when the medium is clear. The description of the NAV and the rules and exceptions relating to the NAV, as set forth in the 802.11-1999 specification, are complex, difficult to understand, distributed throughout the 802.11 standard and are not found in one section.

For example, when the NAV counter has a non-zero value, the WM is assumed to be occupied, regardless whether the CCA indicates that the WM is idle, and, accordingly, a STA will not transmit. The NAV can be activated (i.e., set) or cleared based on a number of circumstances, and there are exceptions that allow the NAV to be ignored and for transmission to occur.

Another fundamental concept found in the 802.11 standard is the concept of a Basic Service Set (BSS). By definition, a BSS is a set of stations (STAs) that are controlled by a single coordination function. Infrastructure, within the context of the 802.11 standard, is defined to include the distribution system medium (DSM), access point (AP), and portal entities. Infrastructure is also the logical distribution and integration service functions of an extended service set (ESS). An infrastructure contains one or more APs and zero or more portals in addition to the distribution system (DS). An infrastructure BSS assumes that one STA (referred as an AP) has access to network services that are external to the wireless medium, and provides access to all other STA "associated" with AP. The AP and the STA associated with the AP are referred to as a BSS. It is normally assumed that no STA other than the AP has access to an outside network. An Independent BSS (IBSS) is another form of a BSS. It is assumed that no AP exists in an IBSS and that no STA in an IBSS has access to a network outside the IBSS. Accordingly, a BSS or an IBSS can loosely be thought of as being an independent cell in a cellular network.

A key problem associated with the 802.11 e standard is commonly referred to as the Overlapping BSS problem in which participating STAs in separate BSSs can hear each other's transmissions, and thereby cause their respective CCA functions to defer to each other, and their respective NAV functions to be updated by STAs that are not in the appropriate BSS.

There are drawbacks that are generally only apparent when a Point Coordination Function (PCF) operates in the context of an overlapping BSS. One drawback is that Contention Free Period (CFP) parameters sets from PCFs operating in overlapping BSS may overwrite each other, thereby causing system instability. Another drawback is that a CF-End frame (which indicates the end of a CFP for one of the BSSs) resets the NAV in all STAs receiving the CF-End frame, even when the NAV should still be set for the other BSS when the CFP within that BSS has not yet ended.

Yet another drawback is when a CF-End may also reset the NAV in the middle of an existing frame sequence for which the NAV should still be set. For example, consider an adjacent overlapped BSS situation in which a Request to Send (RTS) frame followed by a Clear to Send (CTS) frame followed by Data frame followed by an ACK (Acknowledgement) frame occurs in one BSS. If a STA in the other BSS "hears" only the CTS frame, its NAV should (properly) be set, thereby preventing transmission by the STA during the pending Data and ACK frames, even when the STA cannot hear the data frame. When a CF-End is received from within the BSS of the STA after the (adjacent-BSS) CTS is received, the STA will be allowed to transmit during the pending Data frame on the adjacent BSS.

Still another drawback is that frame sequences may inappropriately ignore the NAV. For example, when the NAV of a STA is set for a CFP frame occurring in its own BSS, as well as on an adjacent-overlapped BSS, and the STA receives a Polling frame, the STA could respond with a Data frame and possibly interfere with transmissions in the adjacent-overlapped BSS.

Further, while each STA maintains an independent NAV, the NAV value maintained by a particular STA may not be the same NAV value maintained by other STAs within the same BSS. Thus, the behavior of a NAV, as defined by the current 802.11 specification for the NAV, can be unpredictable, particularly for a Point Coordination Function (PCF)-based or a Hybrid Coordination Function (HCF)-based protocol. An HCF is a Point Coordination Function (PCF) that incorporates an enhanced version of the original 802.11 PCF with an enhanced version of the original 802.11 Distributed Coordination Function (DCF) in a single coordination function. Consequently, Quality of Service (QoS) performance can be adversely impacted.

Currently, the 802.11 Standards Committee is developing QoS enhancements for the existing 802.11 standard. A large part of the concept of QoS is the guarantee of the time that a frame (packet) will be delivered on a WLAN. Accordingly, reliable and timely transmission across the wireless medium is critical for achieving QoS.

A number of new protocols have been proposed for the QoS version of 802.11 (referred to as 802.11 e). The new protocols include an Enhanced Distributed Coordination Function (EDCF) and a Hybrid Coordination Function (HCF). When a PCF is present, access to the wireless medium is typically divided into two time periods: a Contention Period (CP) and a Contention Free Period (CFP). The proposed HCF that is included in the current 802.11e draft also permits Contention Free Bursts (CFB). Details of the proposed protocols may be found in the current draft of the 802.11 e standard and many related contributions on the 802.11 web site http://grouper.ieee.org/groups/802/11/. The most recent 802.11 e draft, as of the time of the filing of this application, is D2 and is dated November 2001.

What is needed is a way to provide NAV functionality that overcomes the Overlapped BSS Problem in an IEEE 802.11-type environment. Additionally, what is needed is a way to provide Quality of Service (QoS) enhancements and to control access to a wireless Local Area Network (WLAN) within an IEEE 802.11-type environment.

BRIEF SUMMARY OF THE INVENTION

The present invention provides NAV functionality that overcomes the Overlapped BSS Problem in an IEEE 802.11-type environment. Additionally, the present invention provides Quality of Service (QoS) enhancements and controls access to a wireless Local Area Network (WLAN) within an IEEE 802.11-type environment.

The advantages of the present invention are provided by a method and a system for controlling access to a communication medium of at least one network. According to the present invention, a plurality of event counters are maintained in a station coupled to at least one network through the communication medium. Each event counter has a corresponding context and a corresponding state, and can be embodied as a register or as a virtual counter. Each context defines a response for the corresponding event counter to at least one predetermined event. Each state represents a combined effect for the corresponding counter in response to at least one occurrence of a predetermined event defined by the corresponding context. Determination whether to access the communication medium is based on the state of at least two event counters. Subsequently, the station accesses the communication medium.

According to one aspect of the present invention, the communication medium is a wireless communication medium, at least one network operates in accordance with IEEE-802.11, and at least one network includes at least one Basic Service Set (BSS). Further, at least one network can include an Independent Basic Service Set (IBSS).

According to another aspect of the present invention, at least one event counter is an uncommitted event counter that has been configured in accordance with the corresponding context for the counter. Alternatively or additionally, at least one event counter is a dedicated event counter. Moreover, at least one event counter can have a corresponding context in which at least a portion of the context is implicit. Alternatively or additionally, at least one event counter can have a corresponding context in which at least a portion of the context is explicit.

According to yet another aspect of the present invention, the context corresponding to at least one event counter can include one of information relating to an event causing the counter to be set, information relating to an event causing the counter to be reset, and information relating to a value of the counter that can block access to the communication medium. The information relating to an event causing the counter to be set can include information relating to a predetermined frame type causing the counter to be set. Alternatively or additionally, the context can further include one of at least one parameter relating to a Contention Free Period (CFP), and information relating to an amount of time that has elapsed since the counter was last updated. Alternatively or additionally, the context corresponding to at least one event counter can include one of information relating to a start of a Contention Free Period (CFP) in a Basic Service Set (BSS) of at least one network, information relating to an end of a CFP in the BSS, information relating to an arrival of a predetermined frame type, information relating to a non-arrival of a predetermined frame type by a predetermined time, information relating to an arrival of a frame containing a duration value, an arrival of a frame containing a transmission suppression command, and information relating to an arrival of a beacon frame containing at least one CFP parameter. Alternatively or additionally, the context corresponding to at least one event counter can include one of information relating to receipt of a duration value, information relating to an arrival of a predetermined frame type, and information relating to a non-arrival of a predetermined frame type by a predetermined time. Alternatively or additionally, the context corresponding to at least one event counter can include information relating to a sequence of received frames.

According to still another aspect of the present invention at least two Basic Service Sets (BSSs) are coupled to the communication medium such that at least one BSS is an outside BSS with respect to a first BSS. When the plurality of event counters are maintained in the first BSS, at least one event counter corresponds to a each outside BSS. The context of each event counter corresponding to an outside BSS defines a response of the event counter to at least one predetermined event occurring in the outside BSS. The state of each event counter corresponding to an outside BSS represents a combined effect for the event counter in response to at least one occurrence of a predetermined event in the outside BSS that is defined by the corresponding context for the outside BSS. Determination whether to access the communication medium is based on the state of at least one event counter corresponding to an outside BSS.

When at least one of the event counters is a Contention Free Bursts (CFB) counter, the context of the CFB counter defines a response of the CFB counter to at least one predetermined CFB-related event. The state of the CFB counter represents a combined effect for the CFB counter to at least one occurrence of a predetermined CFB-related event that is defined by the context corresponding to the CFB counter. Determination whether to access the communication medium is based on the state of at least one CFB counter.

When at least one of the event counters is a Transmission Suppression (TxSup) counter, the context of the TxSup counter defines a response of the TxSup counter to at least one predetermined event during a TxSup time interval, which can be defined on a periodic and/or an aperiodic basis. The state of the TxSup counter represents a combined effect for the TxSup counter in response to at least one occurrence of a predetermined event during the TxSup time interval that is defined by the context corresponding to the TxSup counter. Determination whether to access the communication medium is further based on the state of at least one TxSup counter. The context corresponding to a TxSup counter is received from a Management Action Frame that can include one of multicast addressing and broadcast addressing. When a Management Action Frame is received that contains information relating to event information associated with a Transmission Suppression (TxSup) time interval, it is determined whether an event counter is being maintained for the TxSup time interval. The event counter is updated based on event information received with the Management Action Frame when a TxSup counter is being maintained for the TxSup time interval. An event counter corresponding to the TxSup time interval is created when no TxSup counter is being maintained for the TxSup time interval. In the event that a plurality of TxSup counters are being maintained for corresponding TxSup time intervals and a TxSup counter for the TxSup time interval associated with the received event information cannot be created, a least-recently updated TxSup counter is selected. The selected TxSup counter is then allocated to the TxSup time interval associated with the received event information.

When at least two Basic Service Sets (BSSs) are coupled to the communication medium, such that at least one BSS is an outside BSS with respect to a first BSS, and Basic Service Set Identification (BSSID) information is received within the first BSS identifying an outside BSS; a determination is made whether an event counter is being maintained for the outside BSS identified by the received BSSID information. When an event counter is being maintained for the outside BSS identified by the received BSSID information, the event counter is updated based on event information received with the BSSID information. When no event counter is being maintained for the outside BSS, an event counter is created corresponding to the outside BSS identified by the received BSSID. Alternatively, a least-recently updated event counter corresponding to an outside BSS is selected when a plurality of event counters are being maintained for outside BSSs and when an event counter for the outside BSS identified by the received BSSID cannot be created. The selected event counter is then allocated to the outside BSS identified by the received BSSID. As yet another alternative, an event counter corresponding to an outside BSS can be selected based on a strength of a received Beacon signal for the outside BSS when a plurality of event counters are being maintained for outside BSSs and when an event counter for the outside BSS identified by the received BSSID cannot be created. Similarly, the selected event counter is then allocated to the outside BSS identified by the received BSSID.

BRIEF DESCRIPTION OF THE DRAWINGS

The present invention is illustrated by way of example and not by limitation in FIG. 1, which shows a block diagram of an exemplary embodiment of a state machine implementing a NAV system according to the present invention.

DETAILED DESCRIPTION OF THE INVENTION

Figure 1:
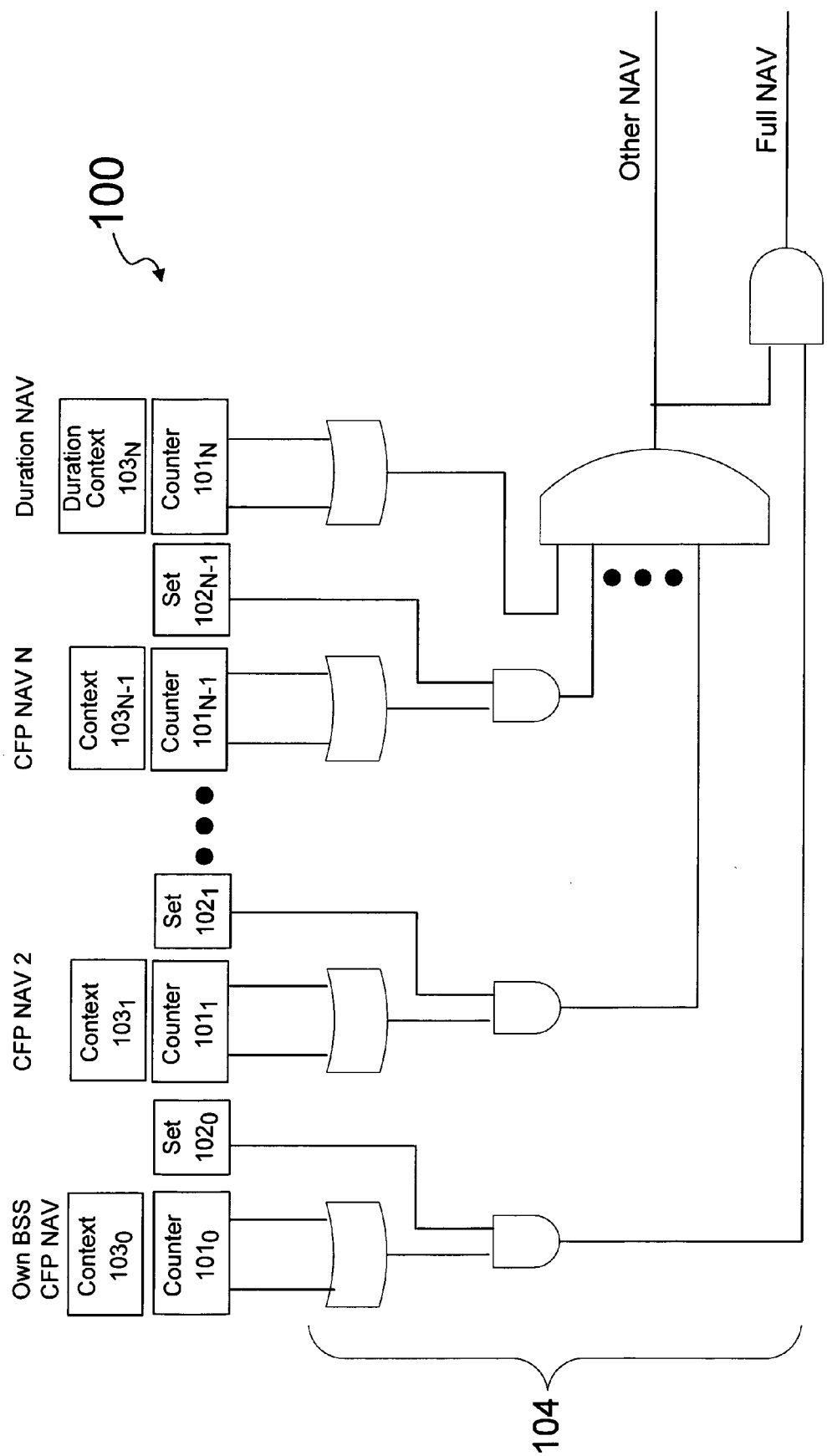

The present invention provides a NAV system in which each STA uses more than one event counter for providing NAV functions. Each event counter of the NAV system provides flexible use, has an associated context and, depending upon the context, has a varying limited capability to block transmissions from a STA maintaining the NAV system counter. The context associated with an event counter includes a set of parameters that are maintained by a STA and that are used for determining the events that cause the counter to be set (i.e., to contain a non-zero value) or reset (i.e., to contain a zero value), and when the value of the counter can block transmission by the STA. For example, the context of a first event counter defines the events that set or reset the first counter based on the specific frame types that have or have not been received. The context of a second event counter defines events that all or some of which, can be the same or be different from the events defined by the context of the first counter.

There are many different realizations possible for the NAV system of the present invention. For example, one exemplary embodiment of a NAV system of to the present invention is a single event counter having associated registers. Another exemplary embodiment of the NAV system of the present invention is a virtual NAV counter that is realized in software by a list of events that is used for determining the behavior of the virtual NAV counter. Each event in the list has an associated pointer to a record containing all of the information describing the event that is being accounted for.

The number of event counters used can vary depending on the number of overlapping BSSs and the number of events that a particular STA is intended to accommodate. If, for example, six overlapping BSSs are to be accommodated, eight counters would be required. Seven of the counters would, in particular, be configured as CFP counters (one for the BSS of the STA and six for overlapping BSSs). The eighth counter would be configured as a Duration counter. The single CFP counter for the BSS of the STA could be configured as a dedicated counter or an uncommitted event counter that as been assigned. Each of the six CFP counters for the overlapping BSSs could be configured as either dedicated or uncommitted (i.e., assignable) counters. In the situation in which a counter is configured as an uncommitted counter, events that are unrelated to events associated with an overlapping BSS can be accommodated.

As mentioned, an event counter can be dedicated or uncommitted (i.e., assignable). Additionally, the context of a counter can be explicit or implicit. When an event counter is configured as a dedicated counter, such as a dedicated CFP counter for the BSS of a STA or a dedicated Duration counter, the context is implicit. When the BSS of a STA and any overlapping BSSs do not use an HCF, the context for a particular event counter includes an identification of each event causing the counter to be set and the Frame Type causing the counter to be set. For example, when the counter is a Duration counter, the context includes information indicating whether an RTS frame causes the Duration counter to be set. Additional context information includes the Basic Service Set Identification (BSSID) corresponding to the counter. When an event counter is configured as a CFP counter, the context includes CFP parameters. When the BSS of a STA and any overlapping BSSs use an HCF, additional context information is required, such as the MAC address of the STA currently holding a transmission opportunity from the HCF.

The rules governing the CFP NAV system of the present invention are as follows. Each STA maintains a single CFP NAV counter corresponding to the BSS of the STA. Each CFP NAV counter, whether dedicated or assignable, is set at the start of a CFP for the corresponding BSSID for the particular CFP NAV counter. CFP parameter values for each respective BSSID are received from a Beacon frame or a Probe Response frame broadcast by the BSS associated with the counter. When a BSSID is received and no CFP NAV counter has been assigned, and the STA has sufficient resources for creating a new CFP NAV counter, the STA sets up a new CFP NAV counter for the new BSSID. When a new BSSID is identified by a STA, but the STA has no available CFP NAV counters nor sufficient resources for creating a new CFP NAV counter, the STA assigns and overwrites the least-recently updated CFP NAV counter to the newly-identified BSSID, except when the least-recently updated CFP NAV counter is the dedicated CFP NAV counter for BSS of the STA. Information relating to how recently a CFP NAV counter has been updated is contained in the context for the counter. Alternatively or additionally, a digital signal processing (DSP)-type filter may be used in a well-known manner for filtering received Beacon signal strength so that only CFP NAV counters corresponding to the strongest beacons are maintained.

Each CFP NAV counter maintained by a STA is automatically set (i.e., recurring set) for the beginning of every CFP. For compliance with the existing IEEE 802.11 standard, the CFP NAV for the BSS of the STA must be updated prior to the first transmission from the STA. Also, a STA originating an RTS frame, for example, does not set the CFP NAV for the BSS, nor does a reply CTS frame cause the CFP NAV for the BSS of the STA to be set. Rather, RTS and CTS frames set the duration NAV based on the duration value contained in their MAC headers. When a CF-End frame for a particular BSSID is received by a STA, the CFP NAV counter corresponding to the BSSID of the received CF-End frame is reset.

The single Duration NAV counter that each STA maintains for the BSS of the STA is set to a nonrecurring value. In particular, the Duration NAV counter is set to a received duration value when the received duration value is greater than the current value of the Duration NAV counter. The second largest received duration value is also tracked because if an event occurs that resets the current value on the Duration NAV counter, the counter should be set back to the next largest duration value rather than to zero. The Duration NAV counter is not set or reset by the start or end of any CFP, nor is the Duration NAV counter set when the STA is a source or a destination STA. For compliance with IEEE 802.11, the Duration NAV of the present invention is set for an ACK frame plus SIFS (short interframe space) in response to a PS-Poll frame. Additionally, the Duration NAV counter is automatically reset when it expires, and is reset when a RTS (request to send) frame with no subsequent CTS (clear to send) frame occurs and no frame starts after the CTS time. The Duration NAV, however, is reset to the next smallest valid duration value rather than to zero.

A STA ignores all of the NAV counters that are maintained by the STA in order to respond with an ACK frame or to a Polling frame. A STA responds only with an ACK frame or a Null frame when the Duration NAV counter is set or a CFP NAV counter for a BSS other than the BSS of the STA is set. When a STA responds with an ACK frame and has data to respond with, but the NAV counter is suppressing transmission by the STA, the More Data field bit of the ACK frame is set. A STA does not respond or transmit for any other frame when any NAV counter is set.

Note that the final implementation of 802.11 e may chose not to respond to a polling frame when the Duration NAV counter is set or a CFP NAV counter for a BSS other than the BSS of the STA is set. Or, the final implantation may simply chose to respond with a Null data frame with the More Data field bit set when the Duration NAV counter is set or a CFP NAV counter for a BSS other than the BSS of the STA is set. Or, the standard may ultimately chose to respond to a poll with an actual data frame (when data is available) when the Duration NAV counter is set or a CFP NAV counter for a BSS other than the BSS of the STA is set. While these three potential behaviors are mutually exclusive, there is rationale for and against each behavior. The present invention described herein enables each of the possible behaviors by separating the function of tracking a STA's own CFP NAV from the other causes setting the NAV.

FIG. 1 shows a block diagram of an exemplary embodiment of a state machine 100 implementing a NAV system according to the present invention. State machine 100 includes CPF NAV counters $101_0$ through $101_{N-1}$, Duration NAV counter $101_N$, set bits $102_0$ through $102_{N-1}$ counter contexts $103_0$–$103_N$, and gating 104. Counter contexts $103_0$–$103_N$ are respectively associated with CPF NAV counters $101_0$ through $101_{N-1}$ and Duration NAV counter $101_N$. For exemplary implementation shown, CFP Counters are used for counting the time to the next CFP, as well. The SET bit is used for differentiating between two counts. That is, when the SET bit is zero, the counter is counting the time until the beginning of the CFP. Logic 104 prevents the effects of this counting from setting the NAV. When the SET bit is one, the counter is counting the time until the end of the CFP on that counter, and logic 104 permits the NAV to be set during this part of the operation. For clarity, the details of how to reset and set the various counters, which depends on the context of each particular NAV counter, are not shown. Also, details of logic 104 that is required on the Full and Other NAV outputs is also not shown for simplicity.

To implement the QoS enhancements set forth in the 802.11 e draft for the HFC, the present invention provides additional NAV usage rules, as follows. The CFP NAV counter corresponding to the BSS of a STA is ignored when the STA responds to a RTS frame (Respond CTS), a Probe (Respond Probe Response) frame, and a contention control (CC) (Respond RR as appropriate). A Contention Free Bursts (CFB) NAV counter is created and maintained that operates with an non-recurring set and is set by a received Duration value. The CFB NAV counter is also set from the value in the Duration field in a QoS Poll frame from the Hybrid Coordinator (HC), which supervises the HCF. The CFB NAV counter is reset for the occurrence of a new QoS poll from the HC, and is set to the value of a Duration field from a poll frame, even when the value of the Duration field from the poll frame is less than the current value of the CFB NAV counter. The CFB NAV counter is reset when a CF-End frame is received from the BSS of the STA. The CFB NAV counter is ignored when the STA responds to a RTS frame, a Probe frame and a CC frame.

The generalized NAV counter approach of the present invention also provides a Transmission Suppression (Tx-Sup) NAV counter capability that can be customized to the environment of each STA for suppressing transmissions from a STA on a periodic or aperiodic basis during a TxSup time interval. This aspect of the present invention provides controlled access to the medium. Such a capability does not exist in the current 802.11 e draft of 802.11-1999 standard. A Management Action Frame is used to load the context for each TxSup NAV counter used. Multicast and broadcast addressing are allowed for the Management Action Frame. The context of a TxSup NAV counter can use the same parameters as are used for the context of a CFP NAV counter, and can use the same response rules as used for the CFP NAV counters are also used. Each TxSup NAV counter takes precedent over CFP NAV counters, except for the CFP NAV counter corresponding to the BSS of the STA. When no unassigned NAV counters are available when a STA creates a TxSup NAV counter, the least-recently updated CFP NAV is replaced with the new TxSup NAV counter. When multiple TxSup NAV counters are used, a STA replaces the least-recently updated TxSup NAV counter.

As previously mentioned, an exemplary embodiment of a virtual NAV system according to the present invention can be an event-driven state machine implemented in software in which each bit in a single NAV register represents the state of each of the individual NAV counters of the NAV system. A full NAV Mask is used for defining valid NAV counters, that is, a mask is used for determining which of the NAV counters are in use. Other NAV Masks are used for excluding the BSS CFP NAV counter and the CFB NAV counter of the STA. Separate masks are used for producing the Full NAV and Other NAV outputs, such as shown in the Figure. The full context is required for realizing all three modes of operation that are described the IEEE 802.11-1999, 802.11e (HFC), and TxSup extension standards. Each NAV counter has a context that includes a NAV Type, the Frame Type of last set; the Time that the NAV counter was last set; the CF Period, the CF Length, and the BSSID. The NAV Type can be, for example, a Duration NAV-type, a CFB NAV-type, a CFP NAV-type and a TxSup NAV-type. The Frame Type will be null when the NAV counter is not set by the last frame type or when the NAV counter is a CFP NAV counter. The CF Period will be null when the NAV counter is a Duration NAV counter or a CFB NAV counter. The CF Length will be null when the NAV counter is a Duration NAV counter or a CFB NAV counter. The BSSID will be null when the NAV counter is a Duration NAV counter or a TxSup NAV counter.

A time-ordered list of pending events is maintained by the software implementation. Preferably, at least sixteen time-ordered events are supported. Alternatively, any number of events can be supported that provides sufficient NAV functionality. Each event also has an associated context that describes how the event should be interpreted when the event occurs. The Event Context includes the Time of Event, the NAV Number (i.e., the particular bit of NAV that is affected, the Type of event, such as a set or a reset, Qualifiers, and RTS Auto Reset. RTS Auto Reset is canceled when a CTS or a start of response frame is detected.

As events occur, the events are removed from the time-ordered list. Removal of an event from the time-ordered list may accordingly cause another event to be added to the list, based on the context of the counters and event list. Other events, such as receiving particular frames, may cause the pending list to be modified.

A timer is set for an event that is expected to occur next in the time-ordered event list. When the timer expires, either the event is implemented and/or the next event is scheduled for recurring events (implementing, for example, the same functionality of the SET bit as previously described). When a frame is received, the present invention determines whether there is a potential NAV impact and, if so, the event is processed based on the NAV system rules of the present invention.

The 802.11 Management Information Base (MIB) could be modified so that the current state and the full context of the NAV counter system according to the present invention in each STA could be accessible for supporting other Overlapped BSS mechanisms.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for controlling access to a communication medium of at least one network, the method comprising steps of:
   maintaining a plurality of event counters, each event counter having a corresponding context and a corresponding state, each context defining a response for the corresponding event counter to at least one predetermined event, and each state representing a combined effect for the corresponding counter in response to at least one occurrence of a predetermined event defined by the corresponding context; and
   determining whether to access the communication medium based on the state of at least two event counters,
   wherein the context corresponding to at least one event counter includes one of information relating to a start of a Contention Free Period (CFP) in a Basic Service Set (BSS) of at least one network, information relating to an end of a CFP in the BSS, information relating to an arrival of a predetermined frame type, information relating to a non-arrival of a predetermined frame type by a predetermined time, information relating to an arrival of a frame containing a duration value, an arrival of a frame containing a transmission suppression command, and information relating to an arrival of a beacon frame containing at least one CFP parameter.

2. A method for controlling access to a communication medium of at least one network, the method comprising steps of:
   maintaining a plurality of event counters, each event counter having a corresponding context and a corresponding state, each context defining a response for the corresponding event counter to at least one predetermined event, and each state representing a combined effect for the corresponding counter in response to at least one occurrence of a predetermined event defined by the corresponding context; and
   determining whether to access the communication medium based on the state of at least two event counters,
   wherein at least two Basic Service Sets (BSSs) are coupled to the communication medium,
   wherein at least one BSS is an outside BSS with respect to a first BSS,
   wherein the step of maintaining the plurality of event counters is performed in the first BSS and maintains at least one event counter corresponding to a each outside BSS, the context of each event counter corresponding to an outside BSS defining a response of the event counter to at least one predetermined event occurring in the outside BSS, and the state of each event counter corresponding to an outside BSS representing a combined effect for the event counter in response to at least one occurrence of a predetermined event in the outside BSS that is defined by the corresponding context for the outside BSS, and
   wherein the step of determining whether to access the communication medium is further based on the state of at least one event counter corresponding to an outside BSS.

3. A method for controlling access to a communication medium of at least one network, the method comprising steps of:

maintaining a plurality of event counters, each event counter having a corresponding context and a corresponding state, each context defining a response for the corresponding event counter to at least one predetermined event, and each state representing a combined effect for the corresponding counter in response to at least one occurrence of a predetermined event defined by the corresponding context; and determining whether to access the communication medium based on the state of at least two event counters, wherein the step of maintaining the plurality of event counters maintains at least one Contention Free Bursts (CFB) counter, the context of the CFB counter defining a response of the CFB counter to at least one predetermined CFB-related event, and the state of the CFB counter representing a combined effect for the CFB counter to at least one occurrence of a predetermined CFB-related event that is defined by the context corresponding to the CFB counter, and wherein the step of determining whether to access the communication medium is further based on the state of at least one CFB counter.

4. A method for controlling access to a communication medium of at least one network, the method comprising steps of:

maintaining a plurality of event counters, each event counter having a corresponding context and a corresponding state, each context defining a response for the corresponding event counter to at least one predetermined event, and each state representing a combined effect for the corresponding counter in response to at least one occurrence of a predetermined event defined by the corresponding context; and determining whether to access the communication medium based on the state of at least two event counters;

wherein the step of maintaining a plurality of event counters maintains at least one Transmission Suppression (TxSup) counter having a corresponding context and a corresponding state, the context corresponding to the TxSup counter defining a response of the TxSup counter to at least one predetermined event during a TxSup time interval, and the state corresponding to the TxSup counter representing a combined effect for the TxSup counter in response to at least one occurrence of a predetermined event during the TxSup time interval that is defined by the context corresponding to the TxSup counter, and wherein the step of determining whether to access the communication medium is further based on the state of at least one TxSup counter.

5. The method according to claim 4, wherein each TxSup time interval occurs on a periodic basis.

6. The method according to claim 4, wherein each TxSup time interval occurs on an aperiodic basis.

7. The method according to claim 4, further comprising a step of receiving the context corresponding to a TxSup counter from a Management Action Frame.

8. The method according to claim 7, wherein at least one received Management Action Frame includes one of multicast addressing and broadcast addressing.

9. A method for controlling access to a communication medium of at least one network, the method comprising steps of:

maintaining a plurality of event counters, each event counter having a corresponding context and a corresponding state, each context defining a response for the corresponding event counter to at least one predetermined event, and each state representing a combined effect for the corresponding counter in response to at least one occurrence of a predetermined event defined by the corresponding context; and determining whether to access the communication medium based on the state of at least two event counters;

further comprising steps of:
receiving a Management Action Frame containing information relating to event information associated with a Transmission Suppression (TxSup) time interval;

determining whether an event counter is being maintained for the TxSup time interval; and updating the event counter based on event information received with the Management Action Frame when a TxSup counter is being maintained for the TxSup time interval.

10. The method according to claim 9, further comprising a step of creating an event counter corresponding to the TxSup time interval when no TxSup counter is being maintained for the TxSup time interval.

11. The method according to claim 9, further comprising steps of:

selecting a least-recently updated TxSup counter when a plurality of TxSup counters are being maintained for corresponding TxSup time intervals and when a TxSup counter for the TxSup time interval associated with the received event information cannot be created; and allocating the selected TxSup counter to the TxSup time interval associated with the received event information.

12. A method for controlling access to a communication medium of at least one network, the method comprising steps of:

maintaining a plurality of event counters, each event counter having a corresponding context and a corresponding state, each context defining a response for the corresponding event counter to at least one predetermined event, and each state representing a combined effect for the corresponding counter in response to at least one occurrence of a predetermined event defined by the corresponding context; and determining whether to access the communication medium based on the state of at least two event counters;

wherein at least two Basic Service Sets (BSSs) are coupled to the communication medium, wherein at least one BSS is an outside BSS with respect to a first BSS, the method further comprising steps of:
receiving Basic Service Set Identification (BSSID) information within the first BSS identifying an outside BSS;

determining whether an event counter is being maintained for the outside BSS identified by the received BSSID information; and updating the event counter based on event information received with the BSSID information when an event counter is being maintained for the outside BSS identified by the received BSSID information.

13. The method according to claim 12, further comprising a step of creating an event counter corresponding to the outside BSS identified by the received BSSID when no event counter is being maintained for the outside BSS.

14. The method according to claim 12, further comprising steps of:

selecting a least-recently updated event counter corresponding to an outside BSS when a plurality of event counters are being maintained for outside BSSs and when an event counter for the outside BSS identified by the received BSSID cannot be created; and allocating the selected event counter to the outside BSS identified by the received BSSID.

15. The method according to claim 12, further comprising steps of:

selecting an event counter corresponding to an outside BSS based on a strength of a received Beacon signal for the outside BSS when a plurality of event counters are being maintained for outside BSSs and when an event counter for the outside BSS identified by the received BSSID cannot be created; and allocating the selected event counter to the outside BSS identified by the received BSSID.

16. A system for controlling access to a communication medium of at least one network, the system comprising a plurality of event counters, each event counter having a corresponding context and a corresponding state, each context defining a response for the corresponding event counter to at least one predetermined event and each state representing a combined effect for the corresponding counter in response to at least one occurrence of a predetermined event defined by the corresponding context and controlling access to the communication medium, wherein the context corresponding to at least one event counter includes one of information relating to a start of a Contention Free Period (CFP) in a Basic Service Set (BSS) of at least one network, information relating to an end of a CFP in the BSS, information relating to an arrival of a predetermined frame type, information relating to a non-arrival of a predetermined frame type by a predetermined time, information relating to an arrival of a frame containing a duration value, an arrival of a frame containing a transmission suppression command, and information relating to an arrival of a beacon frame containing at least one CFP parameter.

17. A system for controlling access to a communication medium of at least one network, the system comprising a plurality of event counters, each event counter having a corresponding context and a corresponding state, each context defining a response for the corresponding event counter to at least one predetermined event and each state representing a combined effect for the corresponding counter in response to at least one occurrence of a predetermined event defined by the corresponding context and controlling access to the communication medium, wherein at least two Basic Service Sets (BSSs) are coupled to the communications medium, wherein at least one BSS is an outside BSS with respect to a first BSS, wherein at least one event counter within the first BSS corresponds to each outside BSS, the context of each event counter corresponding to an outside BSS defining a response of the event counter to at least one predetermined event occurring in the outside BSS, and the state of each event counter corresponding to an outside BSS representing a combined effect for the event counter in response to at least one occurrence of a predetermined event in the outside BSS that is defined by the corresponding context for the outside BSS and controlling access the communication medium.

18. A system for controlling access to a communication medium of at least one network, the system comprising a plurality of event counters, each event counter having a corresponding context and a corresponding state, each context defining a response for the corresponding event counter to at least one predetermined event and each state representing a combined effect for the corresponding counter in response to at least one occurrence of a predetermined event defined by the corresponding context and controlling access to the communication medium, wherein at least one event counter is a Contention Free Bursts (CFB) counter, the context of the CFB counter defining a response of the CFB counter to at least one predetermined CFB-related event, and the state of the CFB counter representing a combined effect for the CFB counter to at least one occurrence of a predetermined CFB-related event that is defined by the context corresponding to the CFB counter and controlling to access the communication medium.

19. A system for controlling access to a communication medium of at least one network, the system comprising a plurality of event counters, each event counter having a corresponding context and a corresponding state, each context defining a response for the corresponding event counter to at least one predetermined event and each state representing a combined effect for the corresponding counter in response to at least one occurrence of a predetermined event defined by the corresponding context and controlling access to the communication medium, wherein at least one event counter is a Transmission Suppression (TxSup) counter having a corresponding context and a corresponding state, the context corresponding to the TxSup counter defining a response of the TxSup counter to at least one predetermined event during a TxSup time interval, and the state corresponding to the TxSup counter representing a combined effect for the TxSup counter in response to at least one occurrence of a predetermined event during the TxSup time interval that is defined by the context corresponding to the TxSup counter, and controlling access the wireless communication medium.

20. The system according to claim 19, wherein each TxSup time interval occurs on a periodic basis.

21. The system according to claim 19, wherein each TxSup time interval occurs on an aperiodic basis.

22. The system according to claim 19, wherein the context corresponding to a TxSup counter is received from a Management Action Frame.

23. The system according to claim 22, wherein at least one received Management Action Frame includes one of multicast addressing and broadcast addressing.

* * * * *